(12) United States Patent
Zhang

(10) Patent No.: US 8,730,397 B1
(45) Date of Patent: May 20, 2014

(54) PROVIDING A PHOTOBOOK OF VIDEO FRAME IMAGES

(75) Inventor: Tong Zhang, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 791 days.

(21) Appl. No.: 12/551,163

(22) Filed: Aug. 31, 2009

(51) Int. Cl.
*H04N 9/74* (2006.01)
*G06K 9/62* (2006.01)
*G06K 9/60* (2006.01)
*G06F 17/30* (2006.01)

(52) U.S. Cl.
USPC ........... 348/583; 348/559; 382/224; 382/305; 707/737; 707/741

(58) Field of Classification Search
USPC .......... 348/584; 382/284, 118, 106, 190, 264, 382/224, 305, 296; 386/125; 707/752, 812, 707/705, 734, 741
See application file for complete search history.

(56) References Cited

U.S. PATENT DOCUMENTS

| 7,386,217 | B2 | 6/2008 | Zhang | |
|---|---|---|---|---|
| 2001/0046330 | A1* | 11/2001 | Shaffer et al. | 382/284 |
| 2003/0206729 | A1* | 11/2003 | Loui et al. | 386/125 |
| 2005/0228849 | A1* | 10/2005 | Zhang | 709/200 |
| 2007/0165968 | A1* | 7/2007 | Terayoko | 382/305 |
| 2008/0215984 | A1* | 9/2008 | Manico et al. | 715/730 |
| 2009/0022424 | A1* | 1/2009 | Chen et al. | 382/284 |

OTHER PUBLICATIONS

Zhang, Tong et al., "Audio Content Analysis for Online Audiovisual Data Segmentation and Classification", *IEEE Trans. on Speech and Audio Processing*, vol. 9, No. 4, (May 2001),441-457.

Gao, Yuli, et al., MagicPhotobook: Designer Inspired, User Perfected Photo Albums, MM'09, Oct. 19-24, 2009, Beijing, China, pp. 979-980.

* cited by examiner

*Primary Examiner* — Michael Lee (57) ABSTRACT

Providing a photobook comprising video frames. One or more selectable images comprising video frames are selected by a computer. The selected one or more selectable images are sorted into related groups by the computer. The related groups are assigned to one or more pages of a photobook by the computer. The selected images of the related groups are positioned by the computer on assigned pages of the photobook.

11 Claims, 5 Drawing Sheets

Before the selecting by a computer one or more selectable images, accesses a video comprising the video frames.
305

Selects by a computer one or more selectable images, the one or more selectable images comprising video frames of a video.
310

Selects by a computer one or more selectable images, the one or more selectable images comprising still images.
315

Sorts by the computer selected one or more selectable images into related groups.
320

Sorts the selected one or more selectable images by event.
325

Sorts the selected one or more selectable images by color.
330

Sorts the selected one or more selectable images by facial indications.
335

Assigns by the computer the related groups to one or more pages of a photobook.
340

Positions by said computer the selected images of the related groups on assigned pages of the photobook.
345

Arrays said selected images from left to right.
350

Arrays said selected images from top to bottom.
355

Selects by the computer one or more selectable audio clips and provides by the computer a downloadable audio clip of selected one or more selectable audio clips.
360

Selects one or more selectable audio clips corresponding to the selected images.
365

Selects one or more selectable audio clips corresponding to one or more images.
405

Provides a downloadable audio clip of selected one or more audio clips.
410

Selects one or more selectable images, the one or more selectable images comprising video frames of a video;
sorts selected images of the video frames into related groups;
assigns the related groups to one or more pages of a photobook; and
positions the selected images of the related groups on assigned pages of the photobook.
415

Selects one or more selectable images, the one or more selectable images comprising still images;
sorts selected images of the still images into related groups;
assigns the related groups to one or more pages of a photobook; and
positions the selected images of the related groups on assigned pages of the photobook.
420

Selects one or more selectable images, the one or more selectable images comprising video frames and still images;
sorts selected images of the video frames and still images into related groups;
assigns the related groups to one or more pages of a photobook; and
positions the selected images of the related groups on assigned pages of the photobook.
425

PROVIDING A PHOTOBOOK OF VIDEO FRAME IMAGES

FIELD

The field of the present invention relates to computing systems. More particularly, embodiments of the present invention relate to organizing photobooks.

BACKGROUND

Cameras are prevalently used today to capture images. For example, events such as birthday parties and graduations may be memorialized in photographs. These photographs may then be placed in photobooks. The process of creating photobooks can be labor intensive. It requires choosing photographs from a multitude of photographs and then arranging these photographs on pages within the photobook. Nowadays, computer technology enables digital photographs to be uploaded to a computer from a digital camera and then organized into a photobook. However, there exist many limitations to the technology of organizing a photobook via computer.

BRIEF DESCRIPTION OF THE DRAWINGS

The accompanying drawings, which are incorporated in and form a part of this specification, illustrate embodiments of the present technology for providing a photobook comprising video frames, together with the description, serve to explain principles discussed below.

The drawings referred to in this description should not be understood as being drawn to scale unless specifically noted.

DESCRIPTION OF EMBODIMENTS

Reference will now be made in detail to embodiments of the present technology, examples of which are illustrated in the accompanying drawings. While the present technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description, numerous specific details are set forth in order to provide a thorough understanding of embodiment of the present technology. However, embodiments of the present technology may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present detailed description, discussions utilizing terms such as "selecting", "sorting", "assigning", "positioning", "providing", "arraying", or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. Embodiments of the present technology are also well suited to the use of other computer systems such as, for example, optical and mechanical computers. It should be appreciated that in one embodiment, the present technology may be hardware and firmware, while in another embodiment, the present technology may be hardware and software.

Overview

At present, most existing photobooks only contain still images. However, people are increasingly using video cameras to take more and more videos in place of or in combination with taking still images. Embodiments of the present technology enable the integration of video frames of video content with still images to create a photobook. Additionally, embodiments include the selection of audio clips from video clips to be provided as audio output of the photobook.

More particularly and in brief, embodiments in accordance with the present technology pertain to a video frame integrator hardware module for providing a photobook comprising video frames. In general, embodiments select one or more selectable images comprising video frames of a video. The selected images are then sorted into related groups. The related groups are assigned to one or more pages of a photobook. The selected images of the related groups are positioned on the one or more pages of the photobook. In addition to selecting images comprising video frames of a video, another embodiment selects one or more selectable images comprising still images. In yet another embodiment, audio clips of video clips are selected and made into downloadable audio clips. The content of the downloadable audio clips may be placed on attachable audio buttons to be attached to a photobook page.

Figure 1:
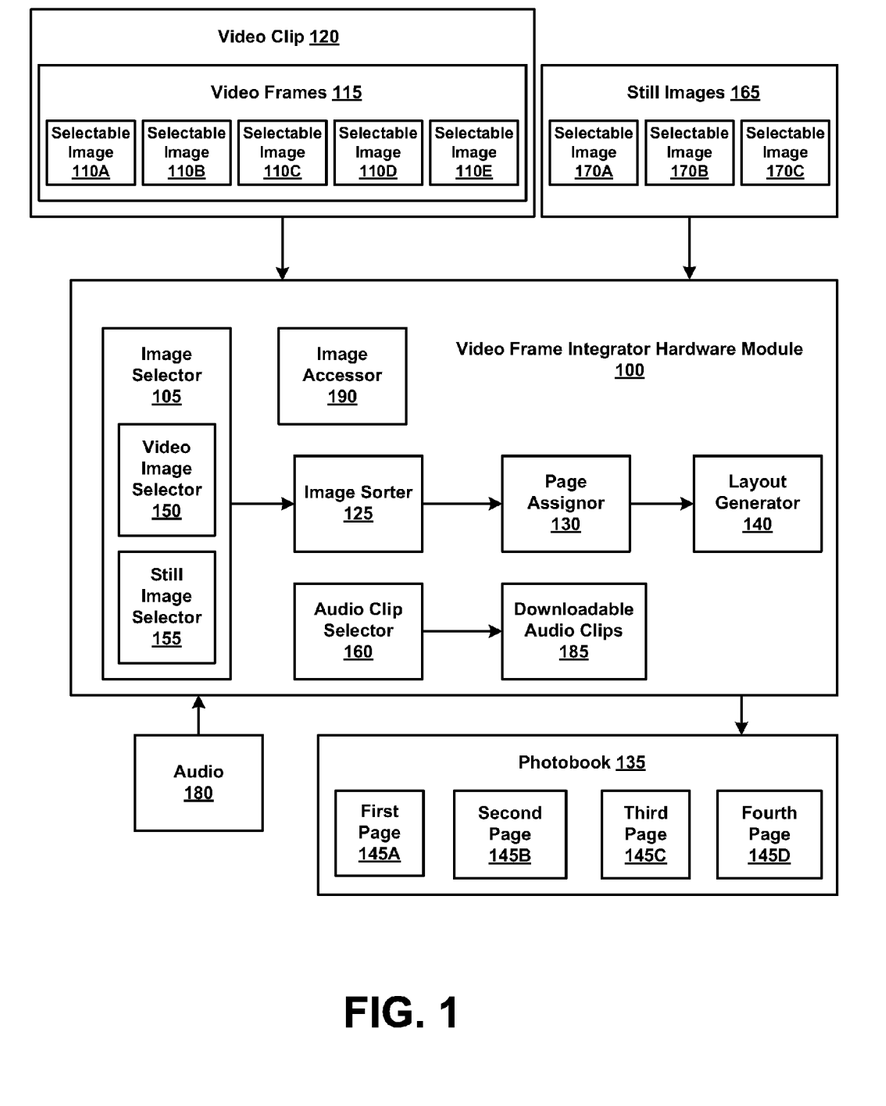
FIG. 1 is a block diagram of an example video frame integrator hardware module 100, in accordance with embodiments of the present technology.

Thus, the present technology may provide a photobook comprising video frame images in one embodiment, video frame images and still images in another embodiment. Further, in one embodiment audio clips relating to the images comprising the photobook may be attached to photobook pages Example Architecture of a Video Frame Integrator Hardware Module FIG. 1 is a block diagram of an example of a system video frame integrator hardware module (VFIHM) 100 upon which embodiments of the present technology can be implemented. In general, the elements of FIG. 1 are described according to the functions they perform. However, elements may perform functions in addition to those described herein. Also, functions described as being performed by multiple elements may instead be performed by a single element. Similarly, multiple functions described as being performed by a single (e.g., multifunctional) element may instead be divided in some way amongst a number of individual elements. Furthermore, the system of FIG. 1 and each of its elements may include elements other than those shown or described herein.

In one embodiment, VFIHM 100 includes an image selector 105, an image sorter 125, a page assignor 130 and a layout generator 140. In one embodiment, image selector 105 comprises video image selector 150. In another embodiment, image selector 105 comprises still image selector 155.

Additionally, FIG. 1 shows image selector 105 making selections from selectable images 110A, 110B, 110C, 110D and 110E (hereinafter, "selectable images 110A-110E") and selectable images 170A, 170B and 170C (hereinafter, "selectable images 170A-170C"). Selectable images 110A-110E comprise video frames 115, which in turn is part of video clip 120. Similarly, selectable images 170A-170C comprises still images 165.

Although the elements of FIG. 1 are described above as having various types of capabilities and functions, embodiments in accordance with the present technology are not so limited. For example, while only one video, video clip 120, is shown, it should be appreciated that selectable images may be selected from any number of video clips. Furthermore, while selectable images 110A-110E and selectable images 170A-170C are shown, it should be appreciated that more or less selectable images may comprise video frames 115 and still images 165, respectively.

In one embodiment, FIG. 1 also shows VFIHM 100, and more specifically, layout generator 140, generating a photobook 135 comprising first page, second page, third page and fourth page, 145A, 145B, 145C and 145D, respectively.

Figure 2:
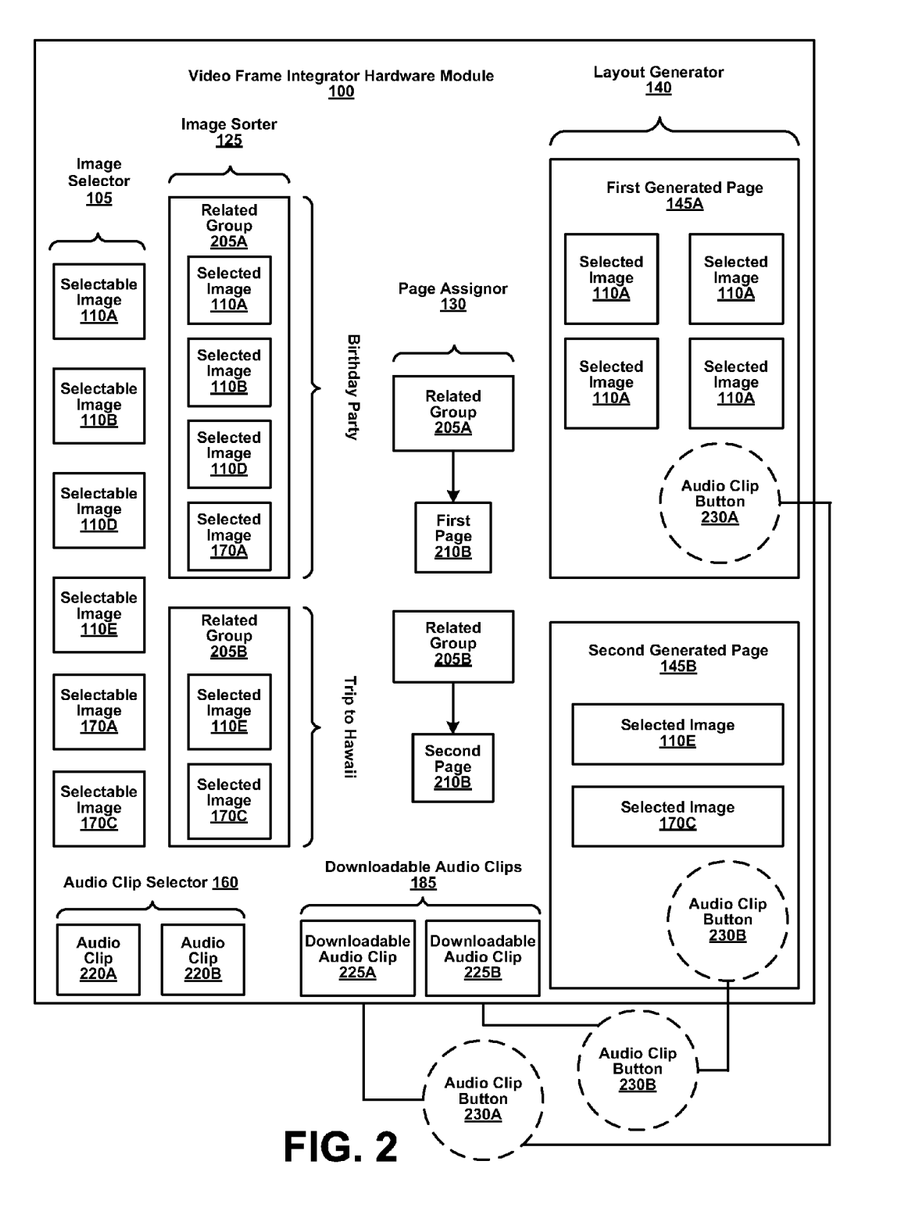
FIG. 2 is a block diagram of an example video frame integrator hardware module 100, showing the components in terms of their functionality, in accordance with embodiments of the present technology.

Referring to FIG. 2, a block diagram of an example VFIHM 100 is shown, in accordance with embodiments of the present technology. In further embodiments, VFIHM 100 includes audio clip selector 160, downloadable audio clip 185 and image accessor 190. Additionally, FIG. 2 shows VFIHM 100 accessing audio 180.

Example Operation of a Video Frame Integrator Hardware Module

More generally, in embodiments in accordance with the present technology, VFIHM 100 is utilized to generate a photobook comprising selected images of video frames of one or more videos. Furthermore, video frame images are sorted into related groups and then positioned on one or more pages of the photobook. In additional embodiments, the photobook comprises selected still images along with the selected images of the video frames. These images are sorted together into related groups, such as a holiday event or a birthday party, and positioned on one or more pages of the photobook.

More particularly, and referring still to FIG. 1, in one embodiment, an image accessor 190 accesses video frames 115 of video clip 120. In another embodiment, image accessor 190 may access still images 165.

Referring to FIG. 1, image selector 105 comprises video image selector 150 and still image selector 155. In one embodiment, video image selector 150 selects images from selectable images 110A-110E of video frames 115. In another embodiment, still image selector 155 selects images from selectable images 170A-170C. In one embodiment, these video frame images are selected to represent the highlight of the video content.

Methods of selecting still images to be included in photobooks are well known in the art. An example of this method is described in "MagicPhotobook: Designer inspired, user perfected photo albums" by Y. Gao, B. Atkins, etc. Methods of selecting video images from a video are well known in the art. An example of this method is described in "Intelligent keyframe extraction from a video", US patent Application No. 200300641, by Tong Zhang.

In one embodiment, the user may determine the number of selected images of the video frames 115 to be selected. In another embodiment, the user may give a range (e.g. the minimum and maximum numbers of frames for making a photobook), and then let an algorithm decide the number of selected images of video frames 115 within the range based on the video content to be selected. The algorithm will also automatically allocate the video frames selected among video clips (video clips 120 and other video clips, if the user selects multiple video clips) and among shots within each video clip, again, based on the video content.

In the case of a mixed still image and video frame image photobook, the method of selecting images of video frames 115 and still images 165 includes several steps. First, a screening process generates candidate still images and candidate video frame images separately. To select a candidate still image, redundancy among still images is removed, and image quality is assessed. To select candidate video frame images, color histogram/layout differences, camera motion, object motion, audio events and face sequences through face detection and tracking are checked.

In general, in one embodiment, both candidate still images and candidate video frame images are meant to be representative and high quality. It is important to note that the parameters (thresholds) for still image selection and video frame image selection were jointly determined empirically, so that the still image content and the video frame image content in the photobook are well balanced. Finally, based on the number of images in the photobook or the range of the number of images provided by the user or the system, the algorithm selects final still images and video frame images to be included in the photobook. In one embodiment, a formula is used to decide the number of still images and the number of video frame images to be included in the photobook, based on the number of candidate still images and the number of candidate video frame images. Within each group, the selection is then based on the importance score.

In one embodiment, once the images to be included in the photobook are finally selected and obtained, they may be displayed to the user in an interactive user interface. When the user views one still photo/video frame image, other similar candidate still images/candidate video frame images or candidate still images/candidate video frame images that are close to it in terms of time, are displayed. From these displayed candidate still images/candidate video frame images, the user may replace the still photo/video frame image with one of the candidates. In the alternative, the user may add more images in the candidates to the photobook.

In another embodiment, VFIHM 100 may display candidate still images and candidate video frame images to the user (in the order of importance score), and let the user manually select the final set.

Referring still to FIG. 1, in one embodiment, the selected images of the one or more selectable images are sorted into related groups by image sorter 125. With regards to the sorting of selected video frame images, sorting may be based on, but not limited to the following features: time stamps (of different video clips [video files]; and of different shots within one video clip [video file]); shot changes; audio changes; motion (e.g., camera motion, object motion); and changes of other features such as color (e.g., histogram, layout). Along with these features, the video clips may be segmented into events and scenes.

When both video frame images and still images are to appear in the same photobook, the original sorting algorithm for still images needs to be changed to include video frame image considerations, such as temporal relations among video frame images. Again, video clips may be first sorted into events (e.g., based on time stamps, in one instance) and scenes (e.g., based on shot changes, audio changes and camera motions), and selected video frame images of the video clips can be grouped based on events, scenes, color and face, in some embodiments. These related groups of video frame images may then be matched with selected still images, and grouped with still images based on, for example, time, color and face. In this way, a sequence of still image/video frame image related groups may be sorted. These sorted related groups may then be assigned to different pages of the photobook.

Referring still to FIG. 1, in one embodiment, the related groups are assigned to one or more pages of the photobook by page assignor 130. For example, the video frame images within the same event or scene, or video frame images with similar color schemes may be assigned to be positioned on the same page.

In one embodiment, and referring to FIG. 1, the selected images of the related groups are positioned by the layout generator 140 on the assigned pages of the photobook. Compared with still image photobook layout, when video frame images are included, there may be additional restrictions in generating a photobook layout. For example, it may be preferred that all video frame images from one video clip/shot have the same size and are put next to each other on the same photobook page. In generating a layout by layout generator 140, in one embodiment, each related group of video frame images may have a rectangle of its own. Further, one related group of video frame images may be of the same size, and arrayed from left to right, and top to bottom in time order.

Referring now to FIG. 2, a block diagram of an example VFIHM 100 is shown, in accordance with embodiments of the present technology. FIG. 2 shows the components of VFIHM 100 in terms of their functionality, thereby assisting in explaining an example implementation of VFIHM 100. For example, in one embodiment, and as described herein, VFIHM 100 comprises an image selector 105, an image sorter 125, a page assignor 130 and a layout generator 140.

In one embodiment, and referring now to FIGS. 1 and 2, of the selectable images 110A-110E and selectable images 170A-170C, via methods known in the art, image selector 105 selects selectable images 110A, 110B, 110D, 110E of video frames 115 and selectable images 170A and 170C of still images 165 to be part of the photobook 135.

In one embodiment, image sorter 125 then sorts these selected images, 110A, 110B, 110D, 110E, 170A and 170C into related groups, via methods described herein and known in the art. For example, image sorter 125 sorts selectable images 110A, 110B, 110D and 170A to be part of the related group 205A regarding a birthday party. Additionally, image sorter 125 sorts selectable images 110E and 170C to be part of the related group 205B regarding a trip to Hawaii.

In one embodiment, page assignor 130 assigns the related group 205A to first page 210A of photobook 135. Further, page assignor 130 assigns the related group 205B to second page 210B of photobook 135. These assignments, in one embodiment, are based on the time stamps associated with the selected video frame images. For example, the time stamps associated with the selected video frame images of related group 205A regarding the birthday party indicates that the birthday party occurred earlier in time than the trip to Hawaii associated with related group 205B. Therefore, the images of related group 205A are assigned to an earlier page in photobook 135 than the images of related group 205B. However, it should be understood that page assignments may be made that are based on some factor other than time stamps.

In one embodiment, layout generator 140 positions the selected images of related groups 205A and 205B on the assigned pages, resulting in first generated page 145A and second generated page 145B, respectively. The positioning as described herein, in one embodiment, may be performed such that the images are arrayed in a left to right, top to bottom pattern, according to the time stamp of each image. For example in first generated page 145A of FIG. 2, selected images 110A, 110B, 110D each have a time stamp that denotes that image 110A was acquired before image 110B. Image 110B was acquired before image 110D. The still image 170A also has a time stamp that shows that it was acquired after image 110D.

Thus, in line with the left to right and top to bottom pattern prescribed by the layout generator 140, the image 110A occupies the top left hand corner of the first generated page 145A. The image 110B occupies the top right hand corner of first generated page 145A. Further, the image 110D occupies the lower left hand corner of first generated page 145A and the image 170A occupies the lower right hand corner of the first generated page 145A.

In the alternative, while second page 210B has related group 205 comprising only two selected images 110E and 170C assigned to it. In one embodiment, when there are only two images per page, the layout generator 140 is programmed to automatically position the images in a top to bottom pattern, according to the time stamp given to each image. For example, according to their associated time stamps, image 110E was taken before image 170C. Thus, image 110E is positioned on top of image 170C. Of note, while a left to right, top to bottom pattern of positioning has been described, it should be appreciated that any number of positioning patterns may be used, other than a left to right pattern and/or a top to bottom pattern.

Thus, embodiments of the present technology enable the automatic generation of a photobook that comprises only video frame images, or video frame images integrated with still images.

Referring now to FIG. 1, in one embodiment, audio clip selector 160 selects selectable audio clips from the video clip 120. These audio clips may or may not correspond to the selected images comprising video frames 115 of video clip 120. In another embodiment, audio clip selector 160 selects audio clips from a video clip separate from the video clip 120 from which images are selected, such as audio 180 shown in FIG. 1. In yet another embodiment, audio clip selector 160 selects audio clips from a collection of audio recordings, such as a music collection. Optionally, the music may be selected automatically by an algorithm so as to match the theme of the selected images.

For example, audio events may be detected in the video clips, such as video clip 120. Audio content relating to the selected video frame images may be automatically selected to be the audio output for the photobook 135. For each related group of video frame images (as described herein), audio events are detected from the corresponding audio recordings. Audio events may include speech, music, laughter, screams, expressed acclaim, etc., and may be detected through audio feature analysis and pattern recognition methods. Methods of detecting audio events of audio recordings are well known in the art. For example, some methods are described in "Indexing video by detecting speech and music in audio", U.S. Granted Pat. No. 7,386,217, by Tong Zhang, and "Audio content Analysis for online audiovisual data segmentation and classification" *IEEE Trans. on Speech and Audio Processing*, vol. 9, no. 4, p. 441-457, May 2001, by Tong Zhang and C. C. Jay Kuo.

The user may select the types of audio events of interest form a list, such as a list indicating a child's speech or singing. In one embodiment, the user may even listen to candidate audio events. The user may choose one of these candidate audio events as the audio output of one page of the photobook or even the whole photobook. Additionally, in one embodiment, the user may use a simple audio editor to extend the audio clip backward or forward, and/or crop it.

In one embodiment, the VFIHM 100 may display audio content of an entire video clip or entire video clips with different colors to represent different audio types so that the user may grasp the audio content with a glancing view and then listen to the audio output non-linearly in order to choose the desired audio output for the photobook. This visualization of the audio content may be hierarchical or scalable for long audio recordings.

Referring now to FIGS. 1 and 2, in one embodiment, a downloadable audio clip 185 is provided. The audio clip selected by audio clip selector 160 from video clip 120 or a separate audio 180, is processed to become downloadable, such as downloadable audio clips 225A and 225B of FIG. 2. These downloadable audio clips 225A and 225B may be then downloaded onto audio clip buttons 230A and 230B, respectively. In one embodiment, these audio clip buttons 230A and 230B may then be coupled with first generated page 145A and second generated page 145B, respectively. Of note, it should be understood that while audio clip buttons 230A and 230B are shown as a circular shape, any shape may comprise an audio clip button that is capable of being coupled with pages of photobook 135.

Figure 3:
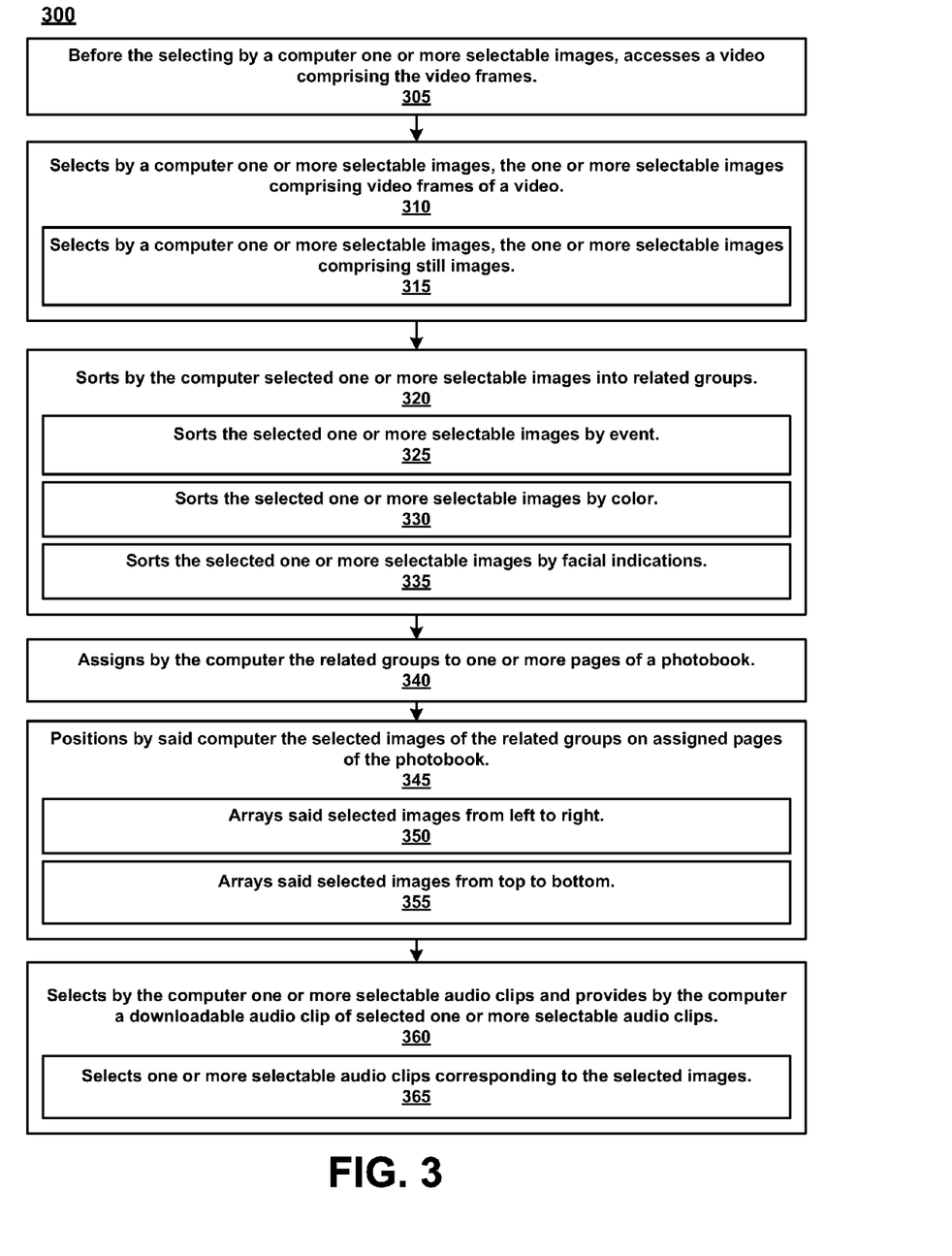
FIG. 3 is a flowchart of an example method for providing a photobook comprising video frames, in accordance with embodiments of the present technology.

FIG. 3 is a flowchart of an example method for providing a photobook comprising video frames, in accordance with embodiments of the present technology. In one embodiment, process 300 is carried out by processors and electrical components under the control of computer readable and computer executable instructions. The computer readable and computer executable instructions reside, for example, in data storage features such as computer usable volatile and non-volatile memory. However, the computer readable and computer executable instructions may reside in any type of computer readable medium. In one embodiment, process 300 is performed by VFIHM 100 of FIG. 1.

Referring to 305 of FIG. 3 and as described herein, in one embodiment, before a selection by a computer of one or more selectable images is made, a video comprising video frames is accessed.

Referring to 310 of FIG. 3, in one embodiment and as described herein, the VFIHM 100 selects by a computer one or more selectable images, the one or more selectable images comprising video frames of a video. In one embodiment and as described herein and referring to 315 of FIG. 3, the one or more selectable images comprises still images.

Referring now to 320 of FIG. 3 and as described herein, in one embodiment, a computer sorts the selected one or more selectable images into related groups. Referring now to 325 of FIG. 3, in one embodiment, the selected one or more selectable images are sorted by event. In another embodiment and referring to 330 of FIG. 3 and as described herein, the selected one or more selectable images are sorted by color. In yet another embodiment and referring to 335 of FIG. 3 and as described herein, the selected one or more selectable images are sorted by facial indicators.

Referring now to 340 of FIG. 3 and as described herein, in one embodiment, the related groups are assigned to one or more pages of a photobook.

Referring now to 345 of FIG. 3 and as described herein, in one embodiment, the computer positions the selected images of the related groups on the assigned pages of the photobook. In one embodiment and referring to 350 of FIG. 3 and as described herein, the selected images of the related groups are arrayed from left to right on the assigned pages. In another embodiment and referring to 355 of FIG. 3 and as described herein, the selected images of the related groups are arrayed from top to bottom on the assigned pages.

Referring now to 360 of FIG. 3 and as described herein, in one embodiment, one or more selectable audio clips are selected by a computer, and a downloadable audio clip of the selected one or more selectable audio clips is provided by the computer. Referring now to 365 of FIG. 3 and as described herein, in one embodiment, the selecting of the one or more selectable audio clips corresponds to the selected images.

Figure 4:
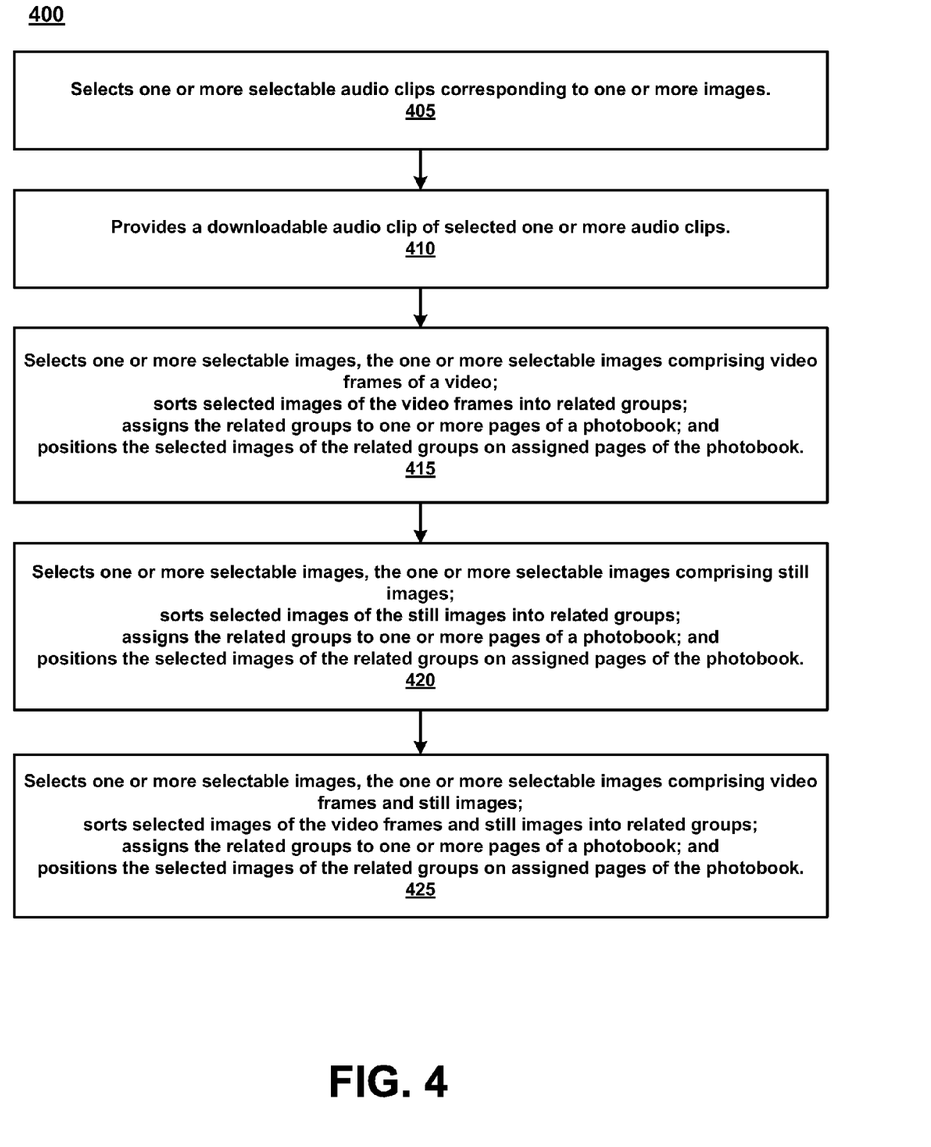
FIG. 4 is a flowchart of an example method for providing audio for a photobook, the audio corresponding to related images, in accordance with embodiments of the present technology.

FIG. 4 is a flowchart of an example computer usable storage medium comprising instructions that when executed provide audio for a photobook, the audio corresponding to related images, in accordance with embodiments of the present technology. In one embodiment, process 400 is carried out by processors and electrical components under the control of computer readable and computer executable instructions. The computer readable and computer executable instructions reside, for example, in data storage features such as computer usable volatile and non-volatile memory. However, the computer readable and computer executable instructions may reside in any type of computer readable medium. In one embodiment, process 400 is performed by VFIHM 100 of FIG. 1.

Referring now to 405 of FIG. 4 and as described herein, in one embodiment, the method of providing audio for a photobook, said audio corresponding to related images, further comprises selecting one or more selectable audio clips corresponding to one or more images. Referring to 410 of FIG. 4 and as described herein, in one embodiment, the method of providing audio for a photobook, said audio corresponding to related images, further comprises providing a downloadable audio clip of the selected one or more audio clips.

Referring now to 415 of FIG. 4 and as described herein, in one embodiment, the method of providing audio for a photobook, said audio corresponding to related images, further comprises selecting one or more selectable images, the one or more selectable images comprising video frames of a video. The selected images of said video frames are sorted into related groups. The related groups of the video frames are then assigned to one or more pages of a photobook. The selected images of the related groups of the video frames are then positioned on the assigned pages of the photobook.

Referring now to 420 of FIG. 4 and as described herein, in one embodiment, the method of providing audio for a photobook, said audio corresponding to related images, further comprises selecting one or more selectable images, the one or more selectable images comprising still images. The selected images of the still images are sorted into related groups. The related groups of the still images are assigned to one or more pages of a photobook. The selected images of the related groups of the still images are then positioned on the assigned pages of the photobook.

Referring to 425 of FIG. 4 and as described herein, in one embodiment, the method of providing audio for a photobook, said audio corresponding to related images, further comprises selecting one or more selectable images, the one or more selectable images comprising video frames and still images.

The selected images are sorted into related group. The related groups are assigned to one or more pages of a photobook. Then, the selected images of the related groups are positioned on assigned pages of said photobook.

Thus, embodiments of the present technology enable a user friendly method for integrating still images, video frame images, and related audio into one photobook.

Example Computer System Environment

Figure 5:
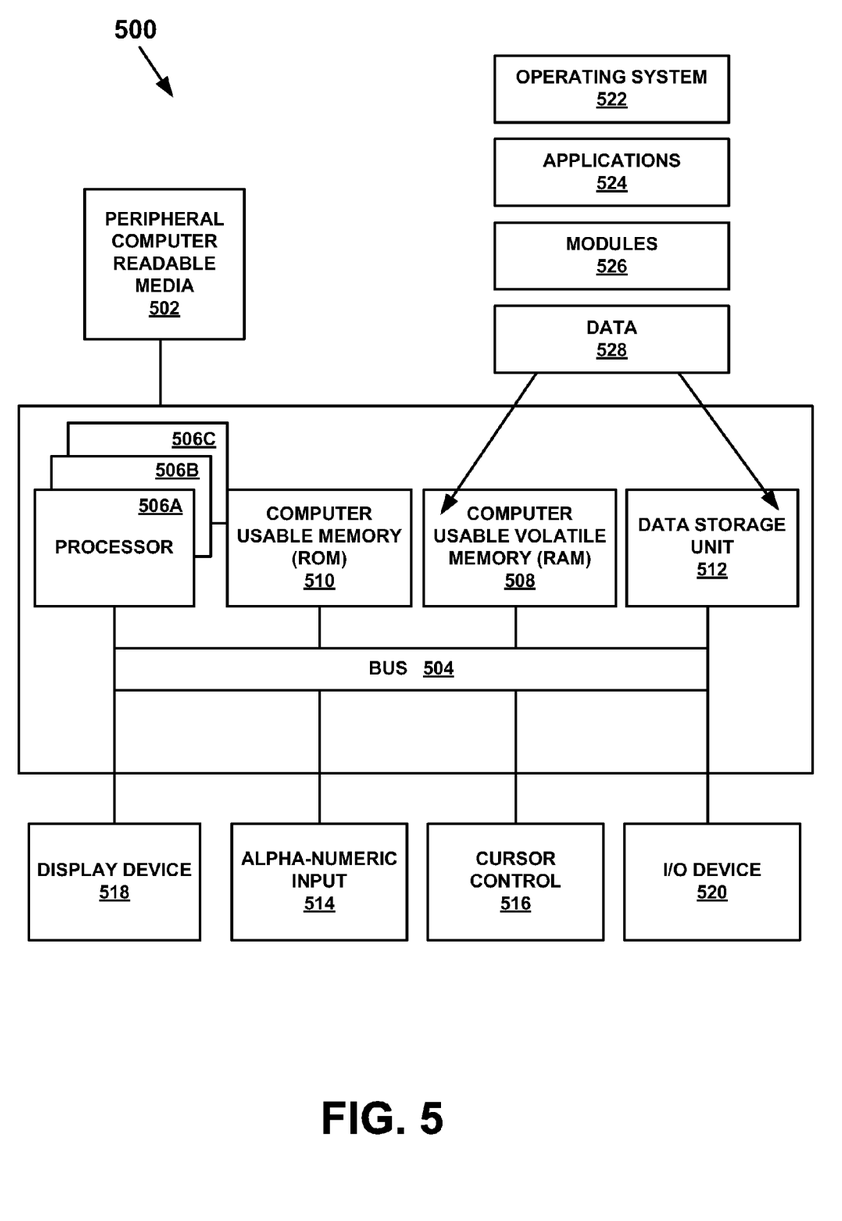
FIG. 5 is a diagram of an example computer system enabling providing a photobook comprising video frames, in accordance with embodiments of the present technology.

FIG. 5 illustrates an example computer system 500 used in accordance with embodiments of the present technology. It is appreciated that system 500 of FIG. 5 is an example only and that embodiments of the present technology can operate on or within a number of different computer systems including general purpose networked computer systems, embedded computer systems, routers, switches, server devices, user devices, various intermediate devices/artifacts, stand alone computer systems, and the like. As shown in FIG. 5, computer system 500 of FIG. 5 is well adapted to having peripheral computer readable media 502 such as, for example, a compact disc, and the like coupled therewith.

System 500 of FIG. 5 includes an address/data bus 504 for communicating information, and a processor 506A coupled to bus 504 for processing information and instructions. As depicted in FIG. 5, system 500 is also well suited to a multi-processor environment in which a plurality of processors 506A, 506B, and 506C are present. Conversely, system 500 is also well suited to having a single processor such as, for example, processor 506A. Processors 506A, 506B, and 506C may be any of various types of microprocessors. System 500 also includes data storage features such as a computer usable volatile memory 508, e.g. random access memory (RAM), coupled to bus 504 for storing information and instructions for processors 506A, 506B, and 506C.

System 500 also includes computer usable non-volatile memory 510, e.g. read only memory (ROM), coupled to bus 504 for storing static information and instructions for processors 506A, 506B, and 506C. Also present in system 500 is a data storage unit 512 (e.g., a magnetic or optical disk and disk drive) coupled to bus 504 for storing information and instructions. System 500 also includes an optional alpha-numeric input device 514 including alphanumeric and function keys coupled to bus 504 for communicating information and command selections to processor 506A or processors 506A, 506B, and 506C. System 500 also includes an optional cursor control device 516 coupled to bus 504 for communicating user input information and command selections to processor 506A or processors 506A, 506B, and 506C. System 500 also includes an optional display device 518 coupled to bus 504 for displaying information.

Referring still to FIG. 5, optional display device 518 of FIG. 5 may be a liquid crystal device, cathode ray tube, plasma display device or other display device suitable for creating graphic images and alpha-numeric characters recognizable to a user. Optional cursor control device 516 allows the computer user to dynamically signal the movement of a visible symbol (cursor) on a display screen of display device 518. Many implementations of cursor control device 516 are known in the art including a trackball, mouse, touch pad, joystick or special keys on alpha-numeric input device 514 capable of signaling movement of a given direction or manner of displacement. Alternatively, it will be appreciated that a cursor can be directed and/or activated via input from alpha-numeric input device 514 using special keys and key sequence commands.

System 500 is also well suited to having a cursor directed by other means such as, for example, voice commands. System 500 also includes an I/O device 520 for coupling system 500 with external entities.

Referring still to FIG. 5, various other components are depicted for system 500. Specifically, when present, an operating system 522, applications 524, modules 526, and data 528 are shown as typically residing in one or some combination of computer usable volatile memory 508, e.g. random access memory (RAM), and data storage unit 512. However, it is appreciated that in some embodiments, operating system 522 may be stored in other locations such as on a network or on a flash drive; and that further, operating system 522 may be accessed from a remote location via, for example, a coupling to the interne. In one embodiment, the present invention, for example, is stored as an application 524 or module 526 in memory locations within RAM 508 and memory areas within data storage unit 512.

Computing system 500 is only one example of a suitable computing environment and is not intended to suggest any limitation as to the scope of use or functionality of embodiments of the present technology. Neither should the computing environment 500 be interpreted as having any dependency or requirement relating to any one or combination of components illustrated in the example computing system 500.

Embodiments of the present technology may be described in the general context of computer-executable instructions, such as program modules, being executed by a computer. Generally, program modules include routines, programs, objects, components, data structures, etc., that perform particular tasks or implement particular abstract data types. Embodiments of the present technology may also be practiced in distributed computing environments where tasks are performed by remote processing devices that are linked through a communications network. In a distributed computing environment, program modules may be located in both local and remote computer-storage media including memory-storage devices.

Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A non-transitory computer readable storage medium having stored thereon, computer-executable instructions that, when executed by the computer, cause the computer to perform a method for providing a photobook comprising video frames, wherein the method comprises:
   select video frame images from a video dip;
   group the selected video frame images into related video frame image groups;
   select still images from a set of selectable still images;
   group the selected still images into related still image groups;
   match related video frame image groups with related still image groups to form sorted related image groups;
   assign the sorted related image groups to different photobook pages;
   select audio content associated with the selected video frame images from the video clip;
   select an audio event from the audio content based on a user selection; and download an audio clip of the audio event to an audio clip button on a photobook page, the audio clip corresponding to selected video frame images on the photobook page.

2. The non-transitory computer readable storage medium of claim 1, wherein selecting video frame images comprises determining an importance score for each video frame image based on color histogram differences, color layout differences, camera motion, object motion, audio events, facial detection and facial tracking.

3. The non-transitory computer readable storage medium of claim 1, wherein grouping the selected video frame images into related video frame image groups comprises grouping the selected video frame images according to factors selected from the group consisting of colors, scenes, faces, and events based on time stamps.

4. The non-transitory computer readable storage medium of claim 1, wherein selecting still images from a set of selectable still images comprises:
    removing redundancy among the selectable still images; and
    assessing image quality of the selectable still images.

5. The non-transitory computer readable storage medium of claim 1, wherein grouping the selected still images into related still image groups comprises grouping the selected still images according to factors selected from the group consisting of colors, scenes, faces, and events based on time stamps.

6. The non-transitory computer readable storage medium of claim 1, wherein matching related video frame image groups with related still image groups to form sorted related image groups comprises matching the related video frame image groups with related still image groups according to colors, scenes, faces, and events based on time stamps.

7. The non-transitory computer readable storage medium of claim 1, wherein selecting audio content associated with the selected video frame images from the video dip comprises:
    detecting audio events from audio recordings corresponding with selected video frame images selected from the video dip; and
    detecting the audio events through audio feature analysis and audio pattern recognition.

8. The non-transitory computer readable storage medium of claim 1, wherein downloading an audio clip of the audio event to an audio dip button on of a photobook page comprises:
    processing the audio dip into a downloadable audio dip from the audio event;
    downloading the downloadable audio clip onto an audio dip button; and
    coupling the audio dip button with the photobook page.

9. The non-transitory computer readable storage medium of claim 1, wherein assigning the sorted related image groups to different photobook pages comprises positioning images of the sorted related image groups on the pages of the photobook, the positioning comprising arraying the images from left to right and from top to bottom on the pages.

10. A computer-implemented method for providing a photobook, comprising:
    selecting by a computer, video frame images from a video clip;
    selecting by the computer, still images from selectable still images;
    selecting an audio clip by the computer, the selecting selected from the group consisting of selecting the audio clip from the video clip, selecting the audio clip from a different video clip, and selecting the audio clip from a collection of audio music recordings;
    integrating by the computer, selected video frame images with selected still images and with the audio clip onto a photobook page;
    selecting audio content from the video clip associated with the selected video frame images;
    processing the audio clip from a user-selected audio event within the audio content into a downloadable audio; and
    downloading the downloadable audio clip onto an audio clip button coupled to the photobook page.

11. The computer-implemented method of claim 10, wherein integrating the selected video frame images with the selected still images comprises:
    sorting selected video frame images and selected still images into related image groups such that the related image groups include both selected video frame images and selected still images, the sorting selected from the group consisting of sorting images by color, sorting images by scenes, sorting images by facial indicators, and sorting images by time-based events.

* * * * *